Jan. 26, 1943. W. D. POWELL 2,309,534
BAIT CARRIER
Filed Aug. 27, 1941

Inventor
William D. Powell.

By Clarence A. O'Brien
Attorney

Patented Jan. 26, 1943

2,309,534

UNITED STATES PATENT OFFICE 2,309,534

BAIT CARRIER

William D. Powell, East Liverpool, Ohio

Application August 27, 1941, Serial No. 408,533

3 Claims. (Cl. 43—56)

My invention relates to improvements in bait carriers, and particularly in the carriers known as minnow buckets, and the primary object of my invention is to provide a simple and efficient arrangement of this character which can be mounted on the bumper of an automobile, and which acts to keep the minnows fresh an unusually long time.

Other important objects and advantages of my invention will be apparent from a reading of the following description taken in connection with the appended drawing, wherein for purposes of illustration I have shown a preferred embodiment of my invention.

In the drawing—

Figure 2:
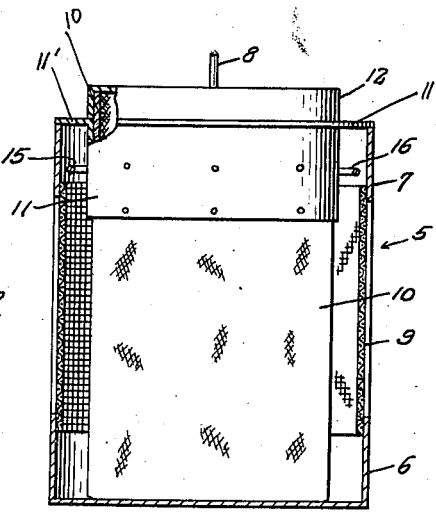
Figure 2 is an enlarged transverse vertical sectional view taken through the bucket.
Figure 1:
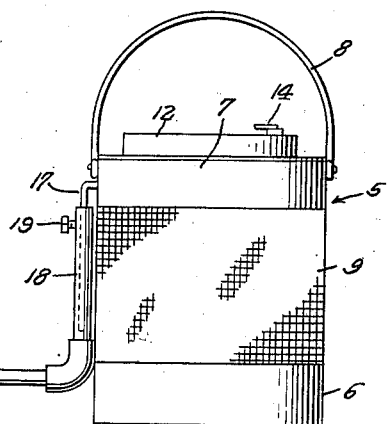
Figure 1 is a general side elevational view of the minnow bucket showing it mounted on its transporting bracket attachable to the bumper of an automobile.
Figure 3:
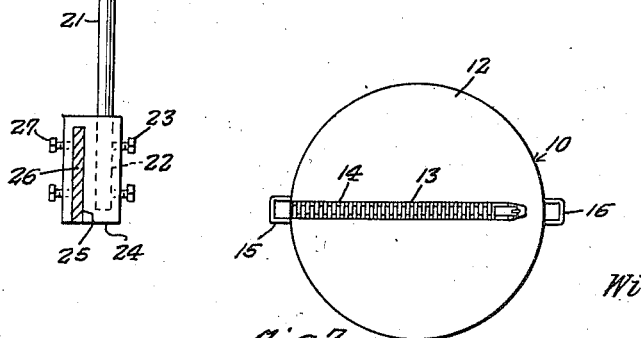
Figure 3 is a top plan view of Figure 1 with the bail handle removed.

Referring in detail to the drawing, the numeral 5 generally designates the bucket as a whole which comprises an outer preferably cylindrical form consisting of a pan-shaped preferably metal bottom 6 to act as a water reservoir, an upper metal ring 7 acting as main support for the bracket to be described, and as a base for the bail handle 8 which is pivotally attached to the outer sides thereof as shown in Figure 1 of the drawing. The ring 7 and the water reservoir 6 are spaced and connected by a cylindrical screen 9 which admits air into the interior of the device, especially when the device is being carried forwardly through the air by reason of the motion of the automobile on which the device is mounted.

Resting on the bottom wall of the pan 6 and securable thereto in any suitable manner, is the preferably cylindrical container 10 which can be made of duck or other suitable material capable of holding water while at the same time admitting air. A reinforcing and form giving preferably metal ring 11 surrounds the upper part of the container 10 and is secured thereto, and has a lateral flange 11' to rest upon the upper end of the upper ring 7. The container 10 rises above the ring 11 where it is provided with a top 12 of the same material as the container, the said top having an opening 13 arranged preferably diametrically therein and adapted to be opened and closed by a slide fastener 14 so as to give ready access to the material of the container 10 while open, and to effectively close and seal the container when closed. The minnows or other similar bait are to be placed in the inner container 10. Additional water is placed in the pan 6 to seep through the walls of the inner container 10. The combined action of the entry of air and water into the inner container 10, together with the natural evaporative effect of the porous walls of the inner wall, being enhanced by the forward motion of the automobile through the air, keep the minnows cool and fresh much longer than by any other similar means known to me.

U-shaped handles 15 and 16 are provided on diametrically opposite sides of the inner container 10 and project from the reinforcing ring 11. These handles serve the double purpose of affording means to handle the inner container when out of the outer container and to act as spacers to keep the inner container spaced properly from the walls of the outer container while the device is in use.

Attached to depend from one side of the outer container ring 7 is the rod 17 which is spaced from the side of the outer container and is adapted to be received in the vertical tubular portion 18 and be locked therein by the set screw 19. The bracket portion 18 is provided on the lateral extremity of a horizontal bracket portion 20 which projects from the upper end of a vertical bracket portion 21 which, in turn, is inserted in a socket 22 and locked therein by means of set screws or studs 23. The socket 22 is formed in a clamp block 24 which has a vertical opening 25 opening from its bottom to receive and seat upon the bar 26 of the automobile bumper. Set screws or studs 27 pass through the block to engage the bumper bar 26. As indicated the bracket may be efficiently and cheaply made of pipe sections and unions or elbows, and the arrangement of the bracket provides adjustability relative to the bucket 5 and to the bumper bar 26, so that different positions of the device may be arranged in accordance with convenience.

Although I have shown and described herein a preferred embodiment of my invention, it is to be definitely understod that I do not wish to limit the application of the invention thereto except as may be required by the scope of the subjoined claims.

Having described the invention, what is claimed as new is:

1. A minnow bucket comprising an outer container having a lower part constituting a water reservoir, a perforated intermediate part, and an upper part, an inner container evenly spaced within the side walls of said outer container and adapted to hold the minnows, a cover on said inner container, said inner container comprising a ring having a lateral flange to rest upon a portion of said upper part of the outer container, said ring being smaller across than the upper part of the outer container, lateral projections on said ring to evenly space the ring from the upper part of the outer container, said inner container further comprising an air and water permeable portion depending from said ring into said water reservoir.

2. A minnow pail comprising an outer container and an inner container, said inner container having the major portion of its side walls spaced from the side walls of said outer container, said outer container comprising a water reservoir formed by its bottom and lower portions of its side walls, the side walls of said outer container above said reservoir being perforated to freely admit air into the space between the outer and inner containers, said inner container comprising an air and water permeable porous material bucket resting on the bottom of said outer container with its upper end rising above the upper end of said outer container, a support frame surrounding and secured to the upper part of said porous bucket below its upper end, said frame having a lateral flange to rest upon the upper end of said outer container, lateral projections on said frame to space said frame from the side walls of said outer container, a cover on the upper end of said bucket, and handle means secured to the outer container for carrying the pail.

3. A minnow pail according to claim 2 wherein said cover is formed on flexible fabric material and provided with a transverse slit in its top, and closure means securing the edges of said slit separably together.

WILLIAM D. POWELL.